US012771008B2

(12) United States Patent
Bang et al.

(10) Patent No.: US 12,771,008 B2
(45) Date of Patent: Oct. 20, 2026

(54) ANTENNA APPARATUS WITH INDUCTION HEATING FUNCTION

(71) Applicant: Korea Institute of Ocean Science & Technology [KIOST], Busan (KR)

(72) Inventors: Jin Kyu Bang, Busan (KR); Seung Jae Baek, Busan (KR); Hui Cheol Shin, Busan (KR); Sung Min Koo, Busan (KR); Min Kim, Busan (KR)

(73) Assignee: Korea Institute of Ocean Science & Technology [KIOST], Busan (KR)

( * ) Notice: Subject to any disclaimer, the term of this patent is extended or adjusted under 35 U.S.C. 154(b) by 0 days.

(21) Appl. No.: 19/242,947

(22) Filed: Jun. 18, 2025

(65) Prior Publication Data

US 2026/0005420 A1 Jan. 1, 2026

(30) Foreign Application Priority Data

Jun. 26, 2024 (KR) ........................ 10-2024-0083613

(51) Int. Cl.
*H01Q 1/02* (2006.01)
*H01Q 21/06* (2006.01)
*H05B 6/36* (2006.01)

(52) U.S. Cl.
CPC ............. *H01Q 1/02* (2013.01); *H01Q 21/065* (2013.01); *H05B 6/362* (2013.01); *H05B 2214/02* (2013.01)

(58) Field of Classification Search
CPC .......... H01Q 1/02; H01Q 1/42; H01Q 21/065; H05B 6/362; H05B 2214/02
See application file for complete search history.

(56) References Cited

U.S. PATENT DOCUMENTS

2017/0141461 A1* 5/2017 Van Dan Elzen ...... B60R 11/04

FOREIGN PATENT DOCUMENTS

CN 121602025 A * 3/2026 ............. H01Q 1/242
KR 20-0359440 Y1 8/2004
KR 10-2023-0147401 A 10/2023

OTHER PUBLICATIONS

Notice of Allowance received in Korean Application No. 10-2024-0083613, dated Sep. 2, 2025, 6 pages.

* cited by examiner

*Primary Examiner* — Daniel Munoz
(74) *Attorney, Agent, or Firm* — CM Law LLP; Robert C. Klinger

(57) ABSTRACT

According to an embodiment, an antenna apparatus with an induction heating function includes a housing, ground unit, patch unit, patch coupler, power supply unit, and controller. The housing is formed by coupling a base plate and a front cover, defining an internal installation space. The ground unit is fixed to the base plate within this space. A thin, metal conductor patch unit is positioned in front of the ground unit, with multiple patch units optionally included. Each patch unit is coupled to the base plate by a respective patch coupler in an electrically insulated state. The power supply unit includes a communication feeding module for supplying signal current to generate RF signals, and an induction power module to supply current for magnetic field generation in the ground unit.

7 Claims, 9 Drawing Sheets

ANTENNA APPARATUS WITH INDUCTION HEATING FUNCTION

CROSS-REFERENCE TO RELATED APPLICATION(S)

This application is based on and claims the benefit of 35 U.S.C. 119 to Korean Patent Application No. 10-2024-0083613, filed on Jun. 26, 2024, in the Korean Intellectual Property Office, the disclosure of which is herein incorporated by reference in its entirety.

TECHNICAL FIELD

The present disclosure relates to an antenna apparatus that includes an induction heating function, and more particularly, to the antenna apparatus is configured to prevent degradation in transmission and reception performance by melting and removing snow or ice that covers the antenna surface, using internally generated heat. The antenna apparatus is effectively deployed in extreme environments.

BACKGROUND

An antenna is a device that transmits and receives invisible wave signals.

The antenna converts electrical signals into electromagnetic waves and vice versa.

Electrical signals are generally expressed in terms of voltage and current, while electromagnetic waves may be represented by electric and magnetic fields.

Electrical signals travel along physically connected conductors, whereas electromagnetic waves are radiated into space with a certain directionality.

Electrical signals transmitted along conductors are converted into electromagnetic waves by the antenna and radiated into space.

Electromagnetic waves are capable of passing through certain materials. On the other hand, there are various materials that block or interfere with the propagation of electromagnetic waves.

In particular, in polar regions, the performance of electronic devices, including communication equipment, is prone to degradation due to harsh weather conditions.

Polar-regions have extremely low temperatures and unpredictable weather changes. In addition, frequent heavy snowfall and strong winds significantly limit outdoor human activities.

Radio frequency (RF) antennas installed in the polar-regions are likely to experience performance degradation by being buried under snow or ice.

Korean Registered Utility Model No. 20-0359440 (hereinafter referred to as “related art”) discloses “Housing for Antenna Protection.”

The related art pertains to an antenna installed in, for example, a base station for mobile communication and, in particular, proposes a housing structure designed to reduce air resistance so that the antenna is not damaged even in strong winds.

However, despite such a technical proposal, there have still been technical limitations in preventing the antenna from being buried in snow or ice or in avoiding antenna performance degradation caused by snow or ice.

Therefore, there was a need to propose technologies to solve these problems.

SUMMARY

One task of the present disclosure is to address the problem of the conventional technology in which antennas installed in polar-regions are easily damaged and frequently failed to perform properly due to snow or ice.

Another task of the present disclosure is to address the problem of the conventional technology in which it is difficult to frequently inspect antennas installed outdoors in harsh environmental conditions of polar-regions.

Still another task of the present disclosure is to address the problem of the conventional technology in which separate dedicated personnel are required to manage antennas installed in various polar-regions.

The tasks of the present disclosure are not limited to those mentioned above, and other tasks not mentioned above can be understood from the following description.

According to an embodiment of the present disclosure, a antenna apparatus having an induction heating function includes a housing, a ground unit, patch units, a patch coupler, a power supply unit, and a controller. The housing may be formed by coupling a base plate and a front cover, and an installation space may be defined inside the housing in which the base plate and the front cover are coupled. The ground unit is coupled to the base plate and accommodated in the installation space. The patch unit is a thin-plate-shaped metal conductor and is disposed in the installation space at a predetermined distance in front of the ground unit. A plurality of patch units may be provided. In addition, a distance by which each of the patch units is spaced apart from the ground unit may be set according to a predetermined frequency band. A plurality of patch couplers are provided to respectively correspond to the patch units, and couple the respective patch units to the base plate in an electrically insulated state. The power supply unit includes a communication feeding module configured to generate RF signals in the respective patch units, and an induction power module configured to supply an induction heating current to form a magnetic field in the ground unit. The controller controls connection and disconnection of the supply of the signal current from the communication feeding module to the patch units, and controls connection and disconnection of the supply of the induction heating current from the induction power module to the ground unit. Each of the patch units is capable of transmitting and receiving RF signals, and is induction-heated by the magnetic field formed in the ground unit.

Alternatively, in the antenna apparatus having an induction heating function according to an embodiment of the present disclosure, the housing includes: a main mounting surface, which is a portion of a front surface of the base plate and is a surface facing forward inside the installation space; a cover coupling end, which protrudes forward from the base plate along an outer periphery of the main mounting surface; an output surface, which is a curved surface forming a front surface of the front cover and has at least a portion protruding forward; and a side guard, which is a wall provided along an outer periphery of the output surface and surrounds and engages with an outer periphery of the cover coupling end.

In the antenna apparatus having an induction heating function according to an embodiment of the present disclosure, the main mounting surface includes: a plurality of parallel fixing pins protruding forward from the main mounting surface, the ground unit being coupled to protruding ends of the fixing pins; and a plurality of coupler seating grooves defined in the main mounting surface so as to correspond to and be coupled with the patch couplers, respectively.

Alternatively, in the antenna apparatus having an induction heating function according to an embodiment of the present disclosure, each of the patch couplers includes: a moving plate formed in a shape corresponding to each of the coupler seating grooves and configured to be coupled in contact with one of the plurality of coupler seating grooves; and an insulating bar extending straight forward from a center of a surface of the moving plate opposite to a surface that is in contact with the coupler seating groove, a corresponding patch unit being fixed to a front end of the insulating bar. The insulating bar extends through the ground unit to connect the moving plate to the corresponding patch unit, such that the moving plate is positioned behind the ground unit and the patch unit is disposed in front of the ground unit.

In the antenna apparatus having an induction heating function according to an embodiment of the present disclosure, each of the coupler seating grooves includes a lift base including a bottom surface with which the moving plate is brought into contact and coupled and configured to move forward to a forward movement state or to move rearward to a rearward movement state via the controller. When the lift base is in the forward movement state, RF signals are generated in the patch unit and the ground unit is disconnected from the induction power module, and when the lift base is in the rearward movement state, the patch unit is disconnected from the communication feeding module and a current for induction heating is supplied to the ground unit.

In the antenna apparatus having an induction heating function, each of the coupler seating grooves includes a bottom surface with which the moving plate is brought into contact and coupled. When the lift base is set to the rearward movement state, a current for induction heating may be supplied to the ground unit, and the communication feeding module may be electrically connected to the patch unit through coupling, so that RF signals may be generated in the patch unit.

Alternatively, the antenna apparatus having an induction heating function according to an embodiment of the present disclosure may include a sensing module configured to collect at least one piece of information from among a temperature of the output surface and a frequency signal radiated through the output surface, and to transmit the collected information to the controller.

In the antenna apparatus having an induction heating function according to an embodiment of the present disclosure, the controller may be configured to cause the patch unit to generate RF signals or to an induction heating current to be supplied to the ground unit based on the information collected via the sensing module.

According to the present disclosure, it is possible to prevent performance degradation of an antenna apparatus by melting and removing snow or ice accumulated on the exterior.

According to the present disclosure, it is possible to prevent an antenna apparatus from being pressed by heavy snow or buried in ice, thereby significantly reducing the likelihood of physical damage or loss of the antenna apparatus.

According to the present disclosure, there is an advantage in that manpower and costs previously required to maintain and repair an antenna apparatus installed outdoors may be greatly reduced.

The effects of the present disclosure are not limited to those mentioned above, and other effects not mentioned will be clearly understood by those ordinarily skilled in the art from the following description.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EXAMPLES

Hereinafter, embodiments of the present disclosure will be described in detail with the accompanying drawings.

Suffixes such as “module” or “unit” described in the description have no distinct meaning or role by themselves.

Relevant known techniques that may be assumed for describing embodiments of the present disclosure may be omitted from the description.

The technical idea of the present disclosure is not limited to the attached drawings.

Terms such as “connected” or “joined” also include cases where a third component is present between the components that are connected or joined to each other. Singular expressions shall include the plural unless the context clearly indicates otherwise.

Terms such as “include” or “have” indicate the presence of the described features, numbers, steps, operations, components, parts, or a combination thereof, and do not preclude the presence of certain features, numbers, steps, operations, components, parts or a combination thereof.

The first direction X, second direction Y, and third direction Z described herein respectively refer to the dimensions on a three-dimensional coordinate system used to express a three-dimensional shape and the directionality assigned to each dimension. Therefore, the first direction X, the second direction Y, and the third direction Z may be represented by arrows that intersect each other perpendicularly at a point in space.

The present disclosure discloses an antenna apparatus 1 including an induction heating function.

The antenna apparatus 1 according to an embodiment of the present disclosure is an RF antenna apparatus 1 used for wireless communication. Wireless communication may include various communication fields such as mobile communication, satellite communication, and wireless LAN.

The antenna apparatus 1 according to an embodiment of the present disclosure may be specified for use based on a frequency range capable of transmission and reception depending on the applied embodiment. The frequency range may be determined by the type of antenna built in, as well as its size and shape.

The antenna apparatus 1 may be applied to various fields requiring communication. In particular, the antenna apparatus 1 according to an embodiment of the present disclosure is proposed to be efficiently usable even in polar-regions with extreme environments such as severe cold or heavy snowfall.

The antenna apparatus 1 according to an embodiment of the present disclosure enables stable communication performance to be ensured even under the harsh climate conditions of polar-regions. In addition, it is possible to prevent snow or ice from accumulating on the exterior.

Figure 1:
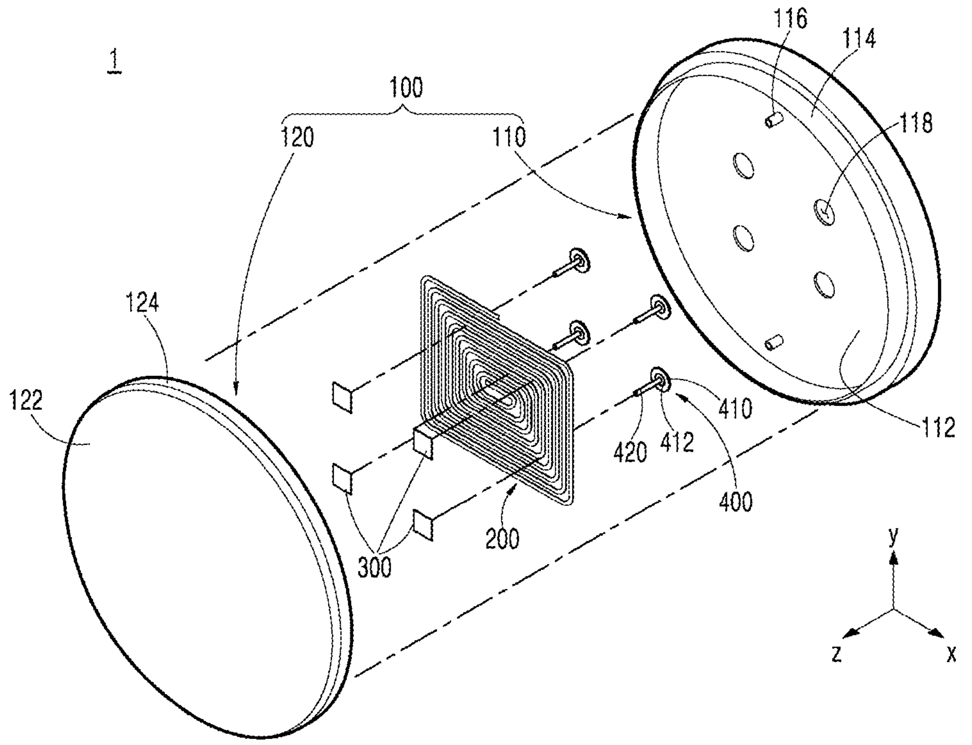
FIG. 1 is an exploded perspective view of an antenna apparatus having an induction heating function according to an embodiment of the present disclosure.
Figure 2:
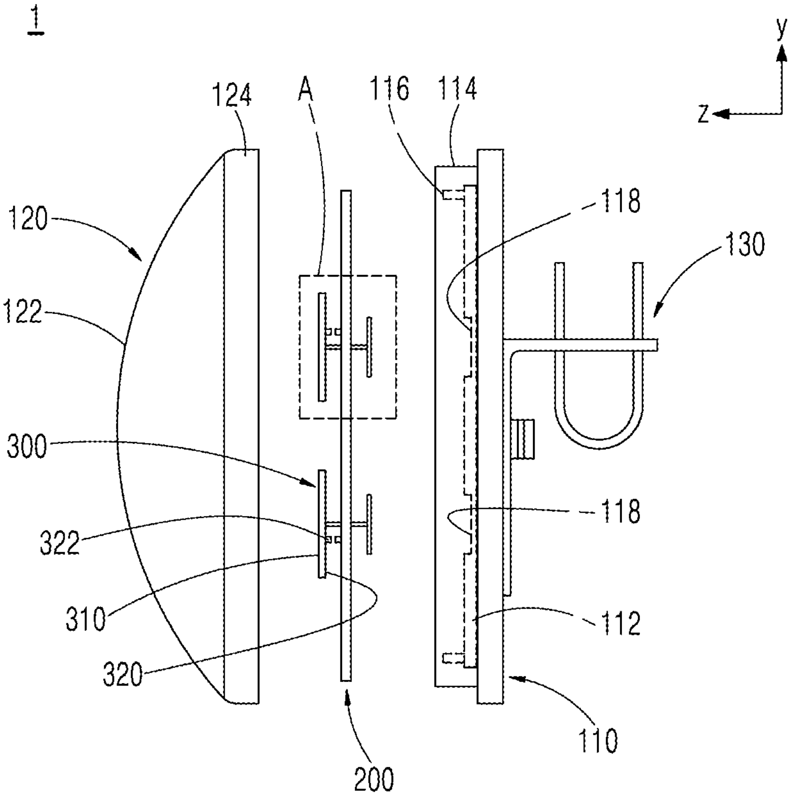
FIG. 2 is a side view illustrating an exploded state of the antenna apparatus having an induction heating function according to an embodiment of the present disclosure.

FIG. 1 is an exploded perspective view of the antenna apparatus 1 having an induction heating function according to an embodiment of the present disclosure. FIG. 2 is a side view illustrating an exploded state of the antenna apparatus 1 having an induction heating function according to an embodiment of the present disclosure.

The antenna apparatus 1 according to an embodiment of the present disclosure includes a housing 100, a ground unit 200, patch units 300, patch couplers 400, and an operation module 500.

As illustrated in FIGS. 1 and 2, the housing 100 is a casing that forms the exterior and includes a base plate 110 and a front cover 120.

The housing 100 refers to the casing formed by the coupling of the base plate 110 and the front cover 120.

The base plate 110 may be formed as a flat plate-shaped member, and a main mounting surface 112, which is a surface facing forward, is provided on the front surface of the base plate 110 with reference to the drawings.

The base plate 110 includes a cover coupling end 114, which is a coupling structure protruding forward along the outer periphery of the main mounting surface 112.

The front cover 120 is coupled to the front side of the base plate 110, and includes an output surface 122, which is a surface exposed toward the front, and a side guard 124, which extends rearward along the outer periphery of the output surface 122 to define a side wall.

An inner surface of the side guard 124 may be configured as a coupling structure corresponding to the cover coupling end 114.

That is, threads may be formed along the outer periphery of the cover coupling end 114, and the inner periphery of the side guard 124 may have a coupling structure configured to be rotationally engaged with the threads formed on the cover coupling end 114.

The output surface 122 may have a central portion that protrudes farthest forward, and the height of the protrusion may decrease toward the outer edge from the central portion, so that the output surface 122 is formed as a predetermined curved surface.

An installation space having a predetermined volume is defined inside the structure in which the base plate 110 and the front cover 120 are coupled to each other. The main mounting surface 112 of the base plate 110 is accommodated within this installation space.

A mounting bracket 130 may be further provided on the rear surface of the base plate 110 to be fixed to a specific structure or support.

The ground unit 200 and the patch units 300 are coupled to the main mounting surface 112 and accommodated within the installation space.

The ground unit 200 is made of a conductive material. The ground unit 200 may have a relatively thin thickness and may be configured as a plate-shaped member with a large surface area on both sides.

The ground unit 200 may be coupled to the main mounting surface 112 via a plurality of parallel fixing pins 116 protruding from the main mounting surface 112.

The ground unit 200 may be disposed such that its broad surfaces are spaced apart from the main mounting surface 112 by a predetermined distance and are parallel to the main mounting surface 112.

The patch units 300 are provided in front of the ground unit 200. As illustrated, a plurality of patch units 300 may be provided. Each patch unit 300 is made of a thin-plate-shaped metal conductor.

As illustrated, each patch unit 300 may be provided as a thin plate member and may be spaced apart forward from the ground unit 200 and in parallel with the ground unit 200.

The patch units 300 may be coupled to the main mounting surface 112 via patch couplers 400.

The patch units 300 may function as an antenna together with the ground unit 200 within the installation space.

The patch units 300 and the ground unit 200 may be implemented as an antenna supporting not only long range (LoRa), Wi-Fi, and Zigbee bands but also mobile communication bands.

The patch units 300 are electrically connected to a communication feeding module 512 of a power supply unit 510 to receive a signal current for communication.

An insulator may further be provided between the ground unit 200 and the patch units 300.

When a signal current is supplied to the patch units 300, the patch units 300 may transmit or detect electromagnetic waves with a certain directionality toward the side opposite to the ground unit 200.

The patch units 300 and the ground unit 200 may have respective gain, directivity, frequency bandwidth, and polarization characteristics appropriately determined depending on the embodiment in which the present disclosure is implemented.

The patch couplers 400 each include a moving plate 410 and an insulating bar 420. The insulating bar 420 is made of a member having insulating properties.

The moving plate 410 is fixed to each of coupler seating grooves 118 defined on the main mounting surface 112. Specifically, one surface of the moving plate 410 may be fixed in contact with a bottom surface of a corresponding one of the coupler seating grooves 118.

The coupler seating grooves 118 may each further include a lift base that is movable in a front-rear direction including the bottom surface.

The lift base may be switched to a forward movement state, in which the bottom surface of the coupler seating groove 118 is translationally moved forward, or a rearward movement state, in which the bottom surface is translationally moved rearward, via a controller 520. The lift base may also be placed in a neutral state via the controller 520.

Figure 3:
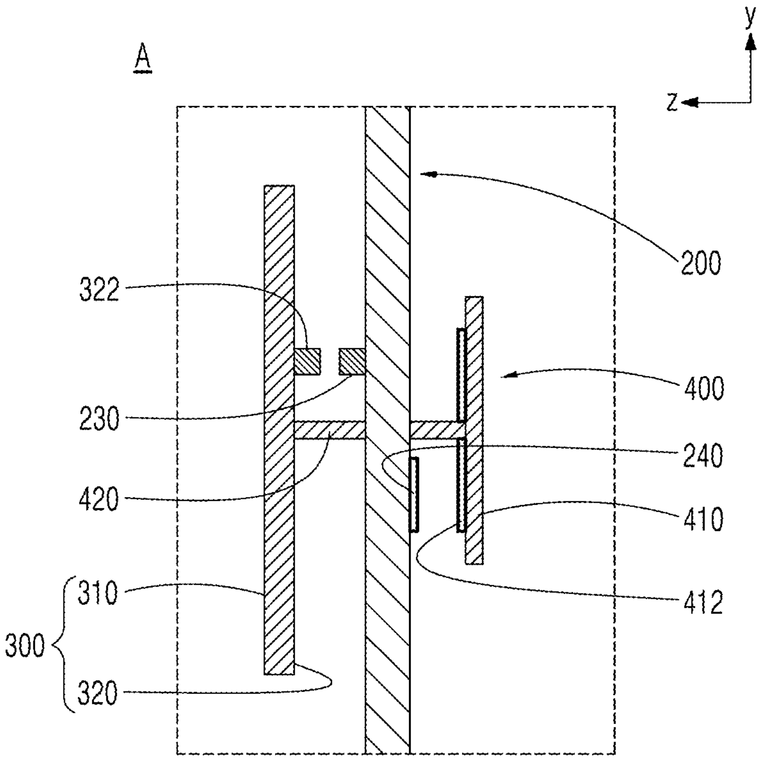
FIG. 3 is a partially enlarged view illustrating portion A of FIG. 2.

FIG. 3 is a partially enlarged view illustrating portion A of FIG. 2.

As illustrated in FIG. 3, each patch unit 300 includes a first surface 310, which is a flat surface facing forward, and a second surface 320, which is a flat surface facing rearward.

The end of the insulating bar 420 of each patch coupler 400 is connected to the second surface 320 formed on each patch unit 300.

The insulating bar 420 formed straight may be arranged such that an imaginary line drawn along its longitudinal direction is orthogonal to the second surface 320 of the patch unit 300.

Accordingly, as the lift base described above moves forward or rearward, the patch coupler 400 also moves forward or rearward together, and the patch unit 300 connected to the patch coupler 400 likewise moves forward or rearward.

FIG. 3 illustrates a case in which the coupler seating groove 118 is in a neutral state. As illustrated in FIG. 3, a communication power supply application end 322 protruding toward the ground unit 200 is provided on the second surface 320 of the patch unit 300.

At a position corresponding to the communication power supply application end 322, a communication power supply terminal 230 protruding toward the communication power supply application end 322 is formed on a front surface of the ground unit 200.

The communication power supply terminal 230 is separated from the ground unit 200 and is connected independently to the communication feeding module 512. The communication power supply terminal 230 may be connected to the communication feeding module 512 via each parallel fixing pin 116 along a path electrically separated from the ground unit 200.

In addition, an induction power terminal 240 protruding rearward may be provided on the rear surface of the ground unit 200.

Furthermore, on the moving plate 410 of the patch coupler 400, an induction power application end 412 protruding toward the corresponding induction power terminal 240 may be formed at a position corresponding to the induction power terminal 240 formed on the ground unit 200.

The induction power application end 412 is connected to the induction power module 514 of the power supply unit 510. Specifically, the induction power application end 412 is electrically connected to the induction power module 514 provided in the power supply unit 510 via the bottom surface of the coupler seating groove 118.

In an embodiment of the present disclosure, the neutral state refers to a state in which both the communication power supply terminal 230 and the communication power supply application end 322, as well as the induction power terminal 240 and the induction power application end 412, are spaced apart from each other. That is, when the lift base of the coupler seating groove 118 is positioned in a predetermined corresponding to an intermediate portion within a forward movable range or a rearward movable range, the coupler seating groove 118 according to an embodiment of the present disclosure may be defined as being in the neutral state.

Figure 4:
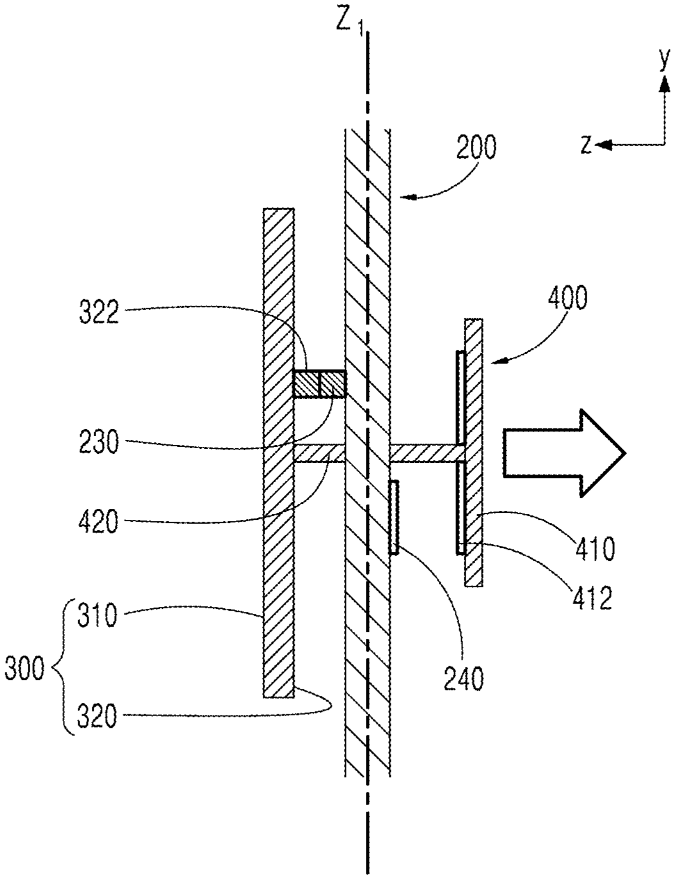
FIGS. 4 and 5 are views illustrating a communication mode in the antenna apparatus having an induction heating function according to an embodiment of the present disclosure.
Figure 5:
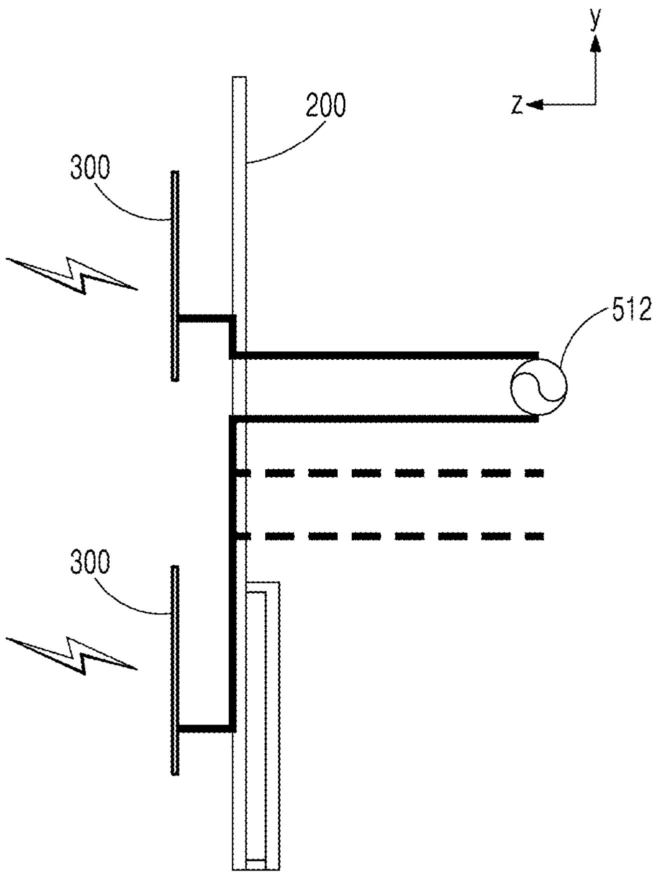

FIGS. 4 and 5 are views illustrating a communication mode in the antenna apparatus 1 having an induction heating function according to an embodiment of the present disclosure.

As illustrated in FIGS. 4 and 5, when the lift base moves rearward, the communication power supply application end 322 formed on the patch unit 300 and the communication power supply terminal 230 formed on the ground unit 200 are electrically connected to each other, while the induction power application end 412 and the induction power terminal 240 are electrically disconnected from each other.

The state, in which the communication power supply application end 322 and the communication power supply terminal 230 are electrically connected to each other so that a signal current is supplied to the patch unit 300, and the ground unit 200 is electrically disconnected from the outside, as described above, may be defined as a rearward movement state. In the rearward movement state, the patch units 300 may function as patch antennas, and may operate in a communication mode in which RF signals can be transmitted and received.

Figure 6:
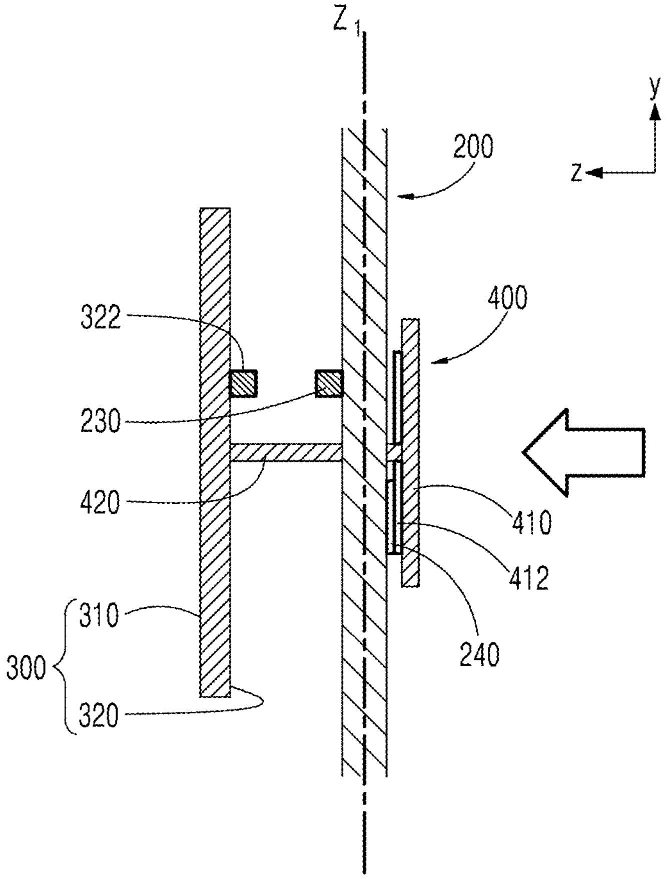
FIGS. 6 and 7 are views illustrating a heating mode in the antenna apparatus having an induction heating function according to an embodiment of the present disclosure.
Figure 7:
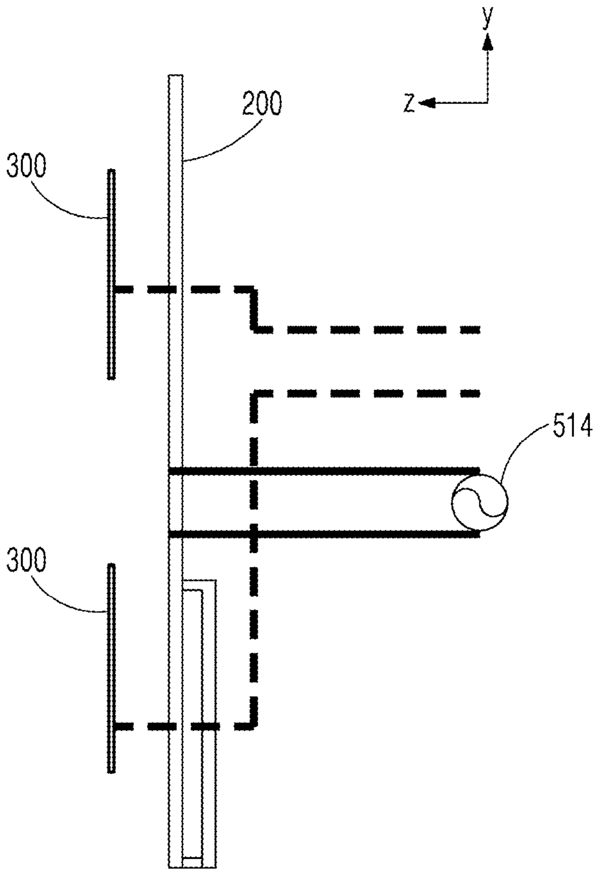

FIGS. 6 and 7 are views illustrating a heating mode in the antenna apparatus 1 having an induction heating function according to an embodiment of the present disclosure.

As illustrated in FIGS. 6 and 7, when the lift base moves forward, the communication power supply application end 322 formed on the patch unit 300 and the communication power supply terminal 230 formed on the ground unit 200 are electrically disconnected from each other. This may be referred to as the forward movement state, in which each induction power application end 412 is electrically connected to a corresponding induction power terminal 240.

In the forward movement state, a current for induction heating is applied to the ground unit 200, and each patch unit 300 is electrically disconnected from the outside.

Figure 8:
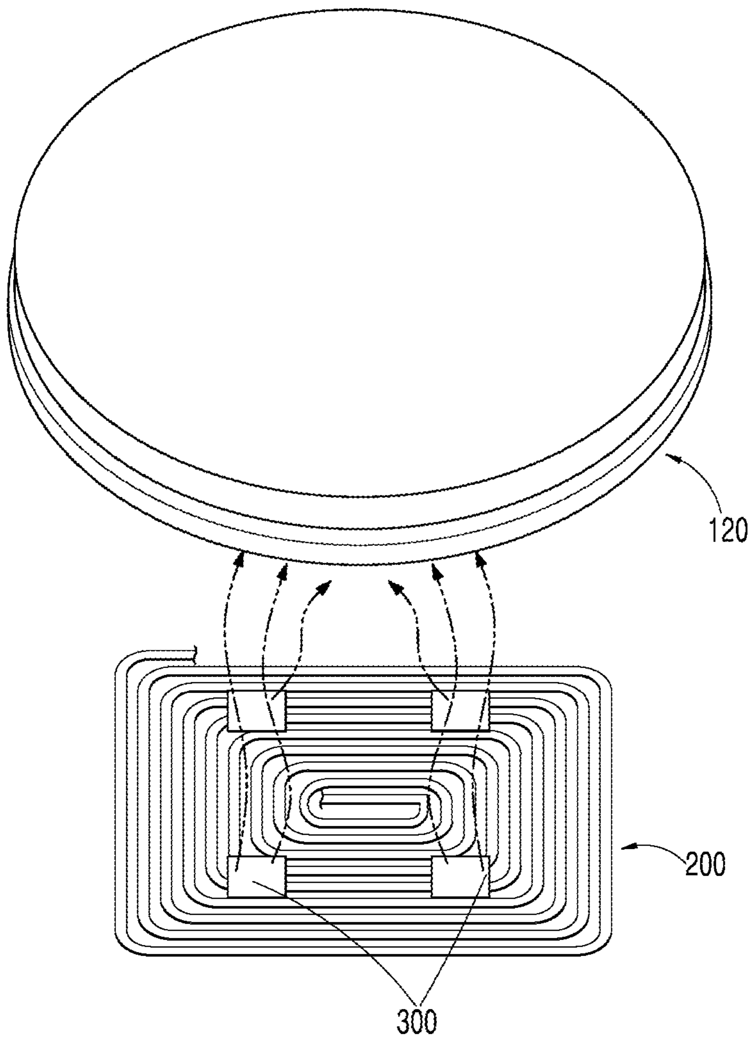
FIG. 8 is a schematic view illustrating a use state in which the heating mode is performed in the antenna apparatus having an induction heating function according to an embodiment of the present disclosure.

FIG. 8 is a schematic view illustrating a use state in which the heating mode is performed in the antenna apparatus 1 having an induction heating function according to an embodiment of the present disclosure.

As illustrated in FIGS. 1 and 8, in an embodiment of the present disclosure, the ground unit 200 may be configured as a flat-plate-type coil. Specifically, the ground unit 200 may be configured in the form of a linear coil densely wound in one direction on an imaginary plane parallel to the X-Y plane. In the ground unit 200, which is a flat-plate-type coil formed by winding a linear coil in one direction on a single plane, a current for induction heating is supplied via the induction power module 514, the induction power application ends 412, and the induction power terminals 240.

The current for induction heating heats the patch units 300. The current for induction heating causes an alternating magnetic flux to be generated around the ground unit 200 while flowing through the ground unit 200. Through this, an induced current flows in the patch units 300, which are conductors, thereby inducing a heating phenomenon in each patch unit 300. That is, when the patch couplers 400 are switched to the rearward movement state, the antenna apparatus 1 according to an embodiment of the present disclosure is switched to a heating mode in which the patch units 300 are induction-heated by the current for induction heating applied to the ground unit 200.

Figure 9:
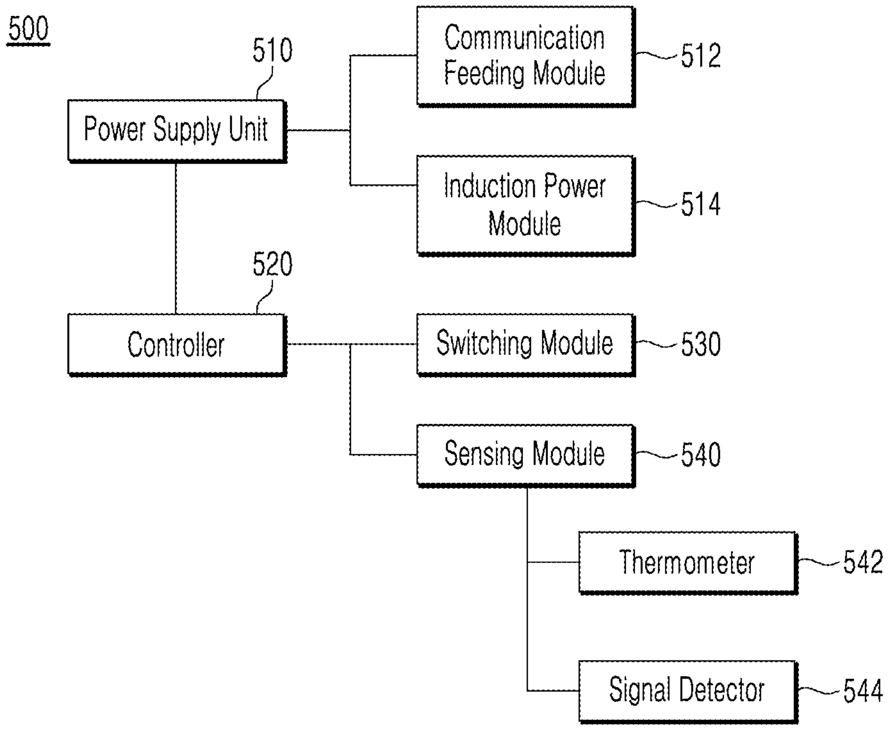
FIG. 9 is a block diagram illustrating some components included in the antenna apparatus having an induction heating function according to an embodiment of the present disclosure.

FIG. 9 is a block diagram illustrating some components included in the antenna apparatus 1 having an induction heating function according to an embodiment of the present disclosure.

As illustrated in FIG. 9, an operation module 500 includes a power supply unit 510 and a controller 520.

The power supply unit 510 may be embedded in the base plate 110 in the form of a battery in which electrical energy is stored. Alternatively, the power supply unit 510 may be provided in a form connected to a power source disposed outside the housing 100.

The power supply unit 510 includes a communication feeding module 512 and an induction power module 514.

The communication feeding module 512 may be configured to be electrically connected to and disconnected from the patch units 300, and when electrically connected to the patch units 300, the communication feeding module 512 supplies a signal current to the patch units 300 so that predetermined RF signals can be transmitted and received through the patch units 300.

The induction power module 514 may be configured to be electrically connected to and disconnected from the ground unit 200, and when electrically connected to the ground unit 200, the induction power module 514 supplies a current to the ground unit 200 so that an alternating magnetic flux for induction heating can be generated in the ground unit 200.

The controller 520 may include a switching module 530 and a sensing module 540.

The controller 520 may operate the switching module 530 to move the lift base forward or rearward according to a predetermined setting.

Alternatively, when a separate input signal or operation command is input to the controller 520, the switching module 530 is operated accordingly to control the coupler seating grooves 118 to be placed in the forward movement state, neutral state, or rearward movement state.

The sensing module 540 may include a thermometer 542 configured to measure at least one of a temperature of the output surface 122 formed on the front cover 120, a temperature inside the installation space, and a temperature outside the installation space.

In addition, when the coupler seating grooves 118 are in the forward movement state or set to the communication mode, the sensing module 540 may further include a signal detector 544 configured to measure predetermined information from RF signals radiated to the outside through the patch units 300 and transmit the measured information to the controller 520.

The controller 520 may operate the switching module 530 based on temperature information collected through the thermometer 542 of the sensing module 540 and information on RF signals detected through the signal detector 544 so as to switch the antenna apparatus 1 according to an embodiment of the present disclosure to one of a communication mode, a neutral state, or a heating mode.

Specifically, when the temperature of the output surface 122 detected by the thermometer 542 is equal to or lower than a predetermined temperature value, the controller 520 may operate the switching module 530 to switch the antenna apparatus 1 to the heating mode.

Alternatively, when resonant frequencies of RF signals collected through the signal detector 544 deviate from a predetermined range and the temperature inside the installation space measured by the thermometer 542 is equal to or lower than a predetermined temperature, the controller 520 may operate the switching module 530 to switch the antenna apparatus 1 to the heating mode.

In the foregoing, the embodiments of the present disclosure have been described with reference to the drawings. These are exemplary and do not limit the present disclosure to the above-described embodiments and the content of the drawings.

It is apparent to a person ordinarily skilled in the art that the present disclosure can be modified within the scope of the disclosed technical ideas. The described embodiments should be considered as part of the present disclosure, and the scope of the present disclosure should not be determined solely by the described embodiments.

The scope of the present disclosure should be determined based on the technical ideas described in the claims. Furthermore, even if the operations or effects according to configurations are not explicitly described while describing the embodiments of the present disclosure, it is apparent that the predictable operations or effects based on the corresponding configurations should naturally be recognized as part of the present disclosure.

What is claimed is:

1. An antenna apparatus having an induction heating function, the antenna apparatus comprising: a housing comprising a base plate and a front cover, an installation space being defined inside the housing by coupling the base plate and the front cover to each other;
- a ground unit coupled to the base plate and accommodated in the installation space;
- a plurality of patch units, each of which is a thin-plate-shaped metal conductor and is disposed in the installation space at a predetermined distance in front of the ground unit;
- a plurality of patch couplers provided to respectively correspond to the plurality of patch units and configured to couple the respective patch units to the base plate in an electrically insulated state;
- a power supply unit comprising a communication feeding module configured to supply a signal current to cause RF signals to be generated in the respective patch units, and an induction power module configured to supply an induction heating current to form a magnetic field in the ground unit; and
- a controller configured to control connection and disconnection of the supply of the signal current from the communication feeding module to the patch units, and to control connection and disconnection of the supply of the induction heating current from the induction power module to the ground unit,
- wherein each of the patch units is configured to transmit and receive RF signals through the supplied signal current, and is configured to be heated by the magnetic field formed in the ground unit.

2. The antenna apparatus of claim 1, wherein the housing comprises:
- a main mounting surface, which is a portion of a front surface of the base plate and is a surface facing forward inside the installation space;
- a cover coupling end, which protrudes forward from the base plate along an outer periphery of the main mounting surface;
- an output surface, which is a curved surface forming a front surface of the front cover and has at least a portion protruding forward; and
- a side guard, which is a wall provided along an outer periphery of the output surface and surrounds and engages with an outer periphery of the cover coupling end.

3. The antenna apparatus of claim 2, wherein the main mounting surface comprises:
- a plurality of parallel fixing pins protruding forward from the main mounting surface, the ground unit being coupled to protruding ends of the fixing pins; and
- a plurality of coupler seating grooves defined in the main mounting surface so as to correspond to and be coupled with the patch couplers, respectively.

4. The antenna apparatus of claim 3, wherein each of the patch couplers comprises:
- a moving plate formed in a shape corresponding to each of the coupler seating grooves and configured to be coupled in contact with one of the plurality of coupler seating grooves; and
- an insulating bar extending straight forward from a center of a surface of the moving plate opposite to a surface that is in contact with the coupler seating groove, a corresponding patch unit being fixed to a front end of the insulating bar, and wherein the insulating bar extends through the ground unit to connect the moving plate to the corresponding patch unit, such that the moving plate is positioned behind the ground unit and the patch unit is disposed in front of the ground unit.

5. The antenna apparatus of claim 4, wherein each of the coupler seating grooves comprises:

a lift base comprising a bottom surface with which the moving plate is fixed in contact, the lift base being configured to move forward to switch to a forward movement state or to move rearward to switch to a rearward movement state via the controller, and wherein, in case that the coupler seating groove is in the forward movement state, a signal current is supplied to the patch unit and the ground unit is disconnected from the induction power module, and in case that the coupler seating groove is in the rearward movement state, the patch unit is disconnected from the communication feeding module and an induction heating current is supplied to the ground unit.

6. The antenna apparatus of claim 2, further comprising:

a sensing module configured to collect at least one piece of information from among a temperature of the output surface and a frequency signal radiated through the output surface, and to transmit the collected information to the controller.

7. The antenna apparatus of claim 6, wherein the controller is configured to supply a signal current to the patch unit or an induction heating current to the ground unit based on the information collected via the sensing module.

* * * * *